United States Patent
Kastl et al.

Patent Number: 6,103,173
Date of Patent: Aug. 15, 2000

[54] METHOD FOR BENDING A COMPONENT MADE OF A THERMOPLASTIC MATERIAL

[75] Inventors: Hans Kastl, Königstein; Ulrich Schenk, Oberursel; Karlheinz Johne, Wiesbaden; Rudolf Majthan, Eschborn, all of Germany

[73] Assignee: Braun Aktiengesellschaft, Germany

[21] Appl. No.: 09/098,135

[22] Filed: Jun. 16, 1998

Related U.S. Application Data

[63] Continuation of application No. PCT/EP97/00128, Jan. 13, 1997.

[30] Foreign Application Priority Data

Feb. 24, 1996 [DE] Germany .......................... 196 07 068

[51] Int. Cl.⁷ .......................... B29C 53/84; B29C 53/08; B29C 53/02
[52] U.S. Cl. ................ 264/297.5; 264/295; 264/296; 264/322; 264/327; 264/339; 264/519; 425/394
[58] Field of Search .................... 264/519, 295, 264/296, 297.5, 322, 327, 339, 340; 425/394

[56] References Cited

U.S. PATENT DOCUMENTS

| | | | |
|---|---|---|---|
| 3,352,960 | 11/1967 | McLaughlin | 264/322 |
| 4,530,729 | 7/1985 | Fuchs et al. | 156/217 |
| 4,649,012 | 3/1987 | Witte | 264/285 |
| 4,904,437 | 2/1990 | Muhlbauer | 264/295 |
| 5,100,319 | 3/1992 | Baum | 433/80 |
| 5,422,048 | 6/1995 | Kodama et al. | 264/23 |
| 5,549,862 | 8/1996 | Vail | 264/238 |

*Primary Examiner*—Jan H. Silbaugh
*Assistant Examiner*—Michael I. Poe
*Attorney, Agent, or Firm*—Fish & Richardson P.C.

[57] ABSTRACT

A method for bending a component made of a thermoplastic material. The component involved is in particular a sleeve-shaped component for a personal care appliance such as a dental care apparatus or the like. For the component to be bent it is heated up to the plastic's softening point. The component is brought into engagement with a forming rail and, during a relative movement of the component and the forming rail, is bent against the forming rail by means of a bending tool. As this occurs, the engagement surface between the component and the forming rail varies continuously.

17 Claims, 4 Drawing Sheets

METHOD FOR BENDING A COMPONENT MADE OF A THERMOPLASTIC MATERIAL

This application is a continuation of PCT/EP97/00128 filed Jan. 13, 1997.

BACKGROUND OF THE INVENTION

This invention relates to a method and a device for bending a component made of a thermoplastic material, particularly a sleeve-shaped component for a personal care appliance such as a dental care apparatus or the like, by heating the component up to the plastic's softening point.

Plastic injection molding methods are conventionally used for the manufacture of large quantities of plastic components. These methods enable components of straight-forward geometrical design to be manufactured with relative ease and at low cost. It is difficult and impractical or uneconomical, however, to use the known injection molding methods for the manufacture of geometrically elaborate components with several openings, undercuts or miniature dimensions, for example. An alternative way to manufacture such plastic components formed to an elaborate geometrical shape is to assemble them from several individual parts, each of which is injection-molded separately in a prior operation. However, this manufacturing approach is not only highly complex but also cost-intensive, particularly where large quantities are involved, hence the need to find an alternative to the multistage manufacturing method for the production of bent sleeve-shaped plastic parts, for example.

Methods and devices for the production and in particular the bending of a plastic component are known in the art. Thus EP 0 464 345 A2 discloses a method and a device for the forming of tubular workpieces made of thermoplastic materials in a mold by the action of heat. This method is characterized in that the amount of heat required for the forming is transferred only to the workpiece to be formed from the inside, and that the workpiece is heated up to the plastic's softening point. The temperature is maintained at this level until the workpiece adopts the shape dictated by a mold, following which the workpiece remains in the mold until it cools.

BRIEF SUMMARY OF THE INVENTION

It is an object of the present invention to provide a method and a device for the forming, particularly bending, of a component made of a thermoplastic material, in particular a sleeve-shaped component for a personal care appliance such as a dental care apparatus or the like, by heating the component. It is a further object of the present invention to provide a component which is manufactured in accordance with a method of the present invention and in a device of the present invention and which meets the geometrical requirements referred to in the foregoing. The method, the device and the component to be provided should be such that they are economical to perform and manufacture respectively, making them suitable in particular for manufacturing products in very large quantities.

This object is accomplished by the present invention in that it provides a method for bending a component made of a thermoplastic material, particularly a sleeve-shaped component for a personal care appliance such as a dental care apparatus or the like, by heating the component up to the plastic's softening point. According to the present invention the component is brought into engagement with a forming rail and, during a relative movement of the component and the forming rail, is bent against the forming rail by means of a bending tool, with the engagement surface between the component and the forming rail varying during the bending operation. The operation of bending a sleeve-shaped component—hereinafter also called sleeve—against a forming rail as disclosed in the invention provides advantageously a method which eliminates the tolerance problems otherwise customary with die bending methods, for example. The sleeve is brought into engagement with the forming rail and is only guided by this rail, whereas a second tool, namely a bending tool, bends the originally straight sleeve against the forming rail. Since the engagement surface between the component to be bent and the forming rail varies, in particular due to the profile construction of a bending edge on the forming rail, the component can be bent advantageously into a wide variety of final shapes. To enable the component to be bent against the engagement surface of the rail, it is moved relative to the forming rail. Advantageously, this movement of the component takes place relative to the stationary forming rail. It is also conceivable, of course, to move the forming rail relative to a stationary component. Furthermore, this method of bending against a forming rail permits the sleeves to be arranged directly one beside or behind the other for bending, enabling advantageously a continuous bending operation and hence an extremely economical bending method.

In an aspect of the present invention, the component to be bent is arranged essentially vertically to the forming rail. In this arrangement, the two main axes of the component and the forming rail are disposed so that they intersect. This gives rise advantageously to an optimum engagement surface between the sleeve and the bending edge of the forming rail, enabling the sleeve to be held and guided easily by its free lower shank.

In a particular aspect of the present invention, the component is brought into linear engagement with the bending edge of the forming rail parallel to the main axis of the component. This results advantageously in a maximum possible engagement surface between the sleeve and the rail, ensuring at the same time an optimum transfer of heat from the heated rail to the sleeve. Hence the sleeve to be bent is permanently in optimum contact with the heated forming rail.

The component to be bent, meaning the sleeve, is moved by a holding and feeding means essentially parallel to the forming rail. The component's holding and feeding function is thus implemented advantageously in an object that enables the sleeve to be guided at a defined parallel distance from the forming rail.

The sleeve is moved by the holding and feeding means at an essentially constant speed relative to the forming rail. This enables a uniform movement of the sleeve along the rail and a continuous feeding and bending operation.

The position of the bending tool relative to the guide rail, particularly to a section at the beginning or end of the guide rail, is altered during the operation. This involves the provision of a second guide rail in an essentially parallel arrangement to the forming rail. This second guide rail has an engagement surface which is constructed to correspond to the engagement surface of the forming rail so that the component to be bent is guided and bent in a channel between the two rails. This channel is of a straight configuration in the section at the beginning of the rails, and of an arcuate configuration in the section at the end, for example.

In a particular aspect of the present invention, it is proposed moving the bending tool as well as the component relative to the rail. This represents an advantageous alternative to the above mentioned configuration of the two guide rails. Obviously, the movements of the bending tool are synchronized with the movement of the feeding means which moves the sleeve. Each component is thus assigned a single bending tool which can be adapted advantageously to the individual bending state of the component.

In a further aspect of the present invention, the bending tool is moved in a plane arranged essentially vertically to the longitudinal axis of the rail. This movement may be superimposed on the above described movement of the bending tool relative to the rail. Any necessary adjustment of the bending tool's position to the position of the sleeve is possible therefore at any time of the bending operation.

The movement made by the bending tool itself may be a straight movement, or alternatively a movement on the arc of a circle. The movement appropriate for the particular case is determined in dependence on the geometry of the component to be formed and on the design possibilities of the bending tool.

A further proposal involves constructing the bending tools to make a continuous movement. This enables advantageously the sleeve to undergo a smooth bending operation against the forming edge of the rail. It is also conceivable, of course, for the movement of the tools to be performed discontinuously as, for example, in clocked mode, should the configuration of the bending rail profile or the component to be bent make this necessary.

In an advantageous embodiment of the present invention, the component to be bent is moved past a stationary heating unit. Such a heating unit may be a warm or hot air blower, for example, which directs the warm air through a slotted nozzle or individual heating nozzles onto the part to be bent.

As an alternative to the above embodiment, moving the heating unit as well as the component relative to a stationary rail may also be contemplated. This results advantageously in uniform heating and high accuracy in directing the heat at selected portions of the components to be bent.

It is also proposed heating the component only partially, in particular in the bend area. This is particularly advantageous when the areas adjoining the bend area on the component or sleeve are not to be deformed or should not be deformed. This applies in particular when component tolerances dictated by the design have to be observed in the adjoining areas.

In a further embodiment of the present invention, several components/sleeves are moved in a linear arrangement relative to the forming rail. The upright arrangement of the sleeves in a line gives rise advantageously to a high density of components, which means that this method can bend sleeves at a high rate per unit of time. The economic efficiency of this method for the production of large quantities is thus increased.

It is an advantage to provide the forming rail with a different profile in a section at the beginning and at the end of the forming rail, enabling the components to be bent into different shapes. Thus the profile of the engagement surface in the section at the beginning of the rail may be a straight line, whereas in the end section of the rail it may be configured as a circular-arc segment.

On the one hand the profile of the forming rail may be varied in steps. It is an advantage, however, for the profile to be varied continuously so that the straight engagement surface in the section at the beginning of the rail, for example, changes gradually and smoothly into a curved engagement surface in the section at the end of the forming rail, for example. The speed of the relative movement between a sleeve and the forming rail is adapted, of course, to the longitudinal dimension of the forming rail. This ensures that the sleeve is advantageously in permanent engagement with the forming rail and that there is a defined transfer of heat from the rail to the sleeve.

A device for implementation of the above described method is proposed in a further embodiment of the present invention, which may also represent an independent invention. This includes a heating unit, a holding and feeding means, and at least two tools movable relative to each other, in particular a forming rail and a bending tool. A component to be bent is positioned between the forming rail and the bending tool. The provision of only one forming member, in particular a forming rail, eliminates advantageously the kind of tolerance problems which arise with other bending devices. The shape to which a component, for example a sleeve, is bent is defined solely by the profiling of the forming rail. It will be understood, of course, that provision may be made not only for the bending tool to be movable relative to the forming rail, but also vice versa for the forming rail to be movable relative to the bending tool. This relative movement enables optimum engagement at all times between the sleeve to be bent and the forming rail.

In a particular embodiment of the present invention, it is proposed configuring the holding means in the form of a mounting mandrel, a bushing, a collet chuck or the like. Simple and secure locating or holding of the sleeve is thus provided advantageously.

For secure and defined holding of the component it is proposed for the holding means to engage on a straight shank of the component which is not subjected to deformation by the bending operation.

The feeding means for accommodating the above described holding means is constructed as a chain or belt conveyor or the like. This provides a simple, reliable and low-cost parts handling device that is also flexible to suit a variety of transport path configurations, a chain/belt conveyor of this type being thus able advantageously to transport the components to be moved in a straight as well as a curved path.

In a particularly advantageous embodiment of the present invention, the tools are heatable. To this effect, the forming rail is made of a heat-conducting metal and equipped with a channel to carry a heating medium. It is, of course, also possible for the bending tool to be heated directly or indirectly to enable the component to be heated uniformly and adequately. A further advantage of the heated tools is the component's reduced sensitivity to bending errors and hence a lower quota of production rejects.

In a further advantageous embodiment of the present invention, the bending tool is moved essentially parallel to the forming rail with the component. This results in optimum engagement of the bending tool with the sleeve to be bent, with the possibility of course for the movements of the bending tool and the holding and feeding means to be synchronized.

In a particular configuration of the present invention, the forming rail has an engagement surface extending essentially over the full length of the forming rail for the component to be bent. It is thus possible for a plurality of sleeves to be in engagement with and bent against one forming rail simultaneously, resulting in a device of high economic efficiency. Furthermore, a uniform and continuous heating of the component over the full length of the forming rail is also assured to advantage.

Particularly advantageously, the engagement surface of the forming rail is equipped with a low-friction surface. A ground or polished and hardened surface on a metal forming rail, for example, produces on the one hand the advantage of an intimate engaging relationship between the component and the forming rail. On the other hand the component to be formed slides with practically zero friction over the engagement surface of the forming rail without the surface of the component to be formed being impaired, in particular without it being changed to disadvantage.

Particularly in its cross section the engagement surface of the forming rail has at least two sections conformed to the outer contour of the component to be formed in order to guide the component. For example, if the component to be formed is provided with two engagement surfaces shaped in a frusto-conical configuration and with their tips pointing at each other, then the bevels of these two engagement surfaces are also reproduced on the engagement surface of the forming rail. This produces advantageously an accurate guidance of the component to be bent against the engagement surface of the rail. The forming rail is equipped with different profiles, particularly in a section at the beginning and at the end thereof. These profiles correspond to the shape of the component to be bent prior to the bending operation and to the final shape of the component as bent. It is thus possible advantageously to reproduce the most diverse rail profiles.

In a particularly advantageous configuration of the forming rail, the profile of the rail in the area of the engagement surface has a straight engagement surface and an arcuate engagement surface which is in particular curved in the manner of a quarter circle. The straight engagement surface, which is preferably in the section at the beginning of the rail, makes it possible to locate a component which prior to the bending operation is shaped like a straight sleeve. When this component leaves the forming rail from the section at the end it has a middle section bent through 90°.

A continuously varying profile from the section at the beginning to the section at the end of the forming rail results in a uniform sleeve bending operation that guarantees permanent contact between the rail and the sleeve.

In an embodiment of the present invention, the forming rail is constructed as a straight rail. This enables advantageously a simple and low-cost construction of the rail and of the feeding and bending device provided parallel to the rail. Furthermore, a straight construction of the rail enables this bending device to be integrated in a linear system for the production of bent sleeves, for example. The sleeves are thus moved from a first device via the straight rail to a second device for further processing.

In a particular embodiment of the present invention and as an alternative to the above described straight rail, the rail is of an arcuate configuration, being in particular configured as an arc of a circle or of a circular segment. An advantageous space-saving arrangement of the bending device is thereby obtained. In this configuration, the bending rail may be arranged as a closed circular arc or arc of a circular segment between two further connected system components.

It is particularly advantageous to use a heating unit to produce hot air. This presents a simple and low-cost solution for uniformly heating the components to be formed to shape. In a particular embodiment the heating unit has heating nozzles adapted to be directed at the component's section to be formed. If the heating nozzles are constructed in a particular design they can be directed accordingly to heat only that area of the component which is to be heated to a softening point for the bending operation. The areas adjoining the area to be formed, which after the bending operation are required to maintain, for example, the geometrical shape they had prior to the bending operation and heating operation, are not heated.

The bending tool itself is equipped with a guide roller adapted to be placed against the end of the component remote from the lower shank. Thanks to the tool's movable guide roller it is possible advantageously for the component to be guided laterally with little friction and bent. The guide roller may have a circumferential groove that is conformed to the outer contour of the component to be bent and prevents the component from twisting to the side during the bending operation. The fact that this guide roller is adapted to be placed against the free end of the component to be bent produces the maximum possible bending radius while the minimum necessary bending force is applied.

The bending tool performs a rectilinear or arcuate movement lying in a plane vertical to the forming rail, that is, to the longitudinal axis of the forming rail. The type of movement performed for the particular case is the one that is most advantageous for the shape of the component to be manufactured. The vertical arrangement of the tool's plane of movement relative to the forming rail affords the advantage for the bending tool to be in a defined position relative to the forming rail at every moment of the bending operation.

In a particular embodiment the bending tool is continuously adjustable to the component to be formed. This enables an advantageously smooth bending operation causing the component to be moved into defined contact with the forming rail at every moment.

In a further aspect of the present invention, magazines are provided at the beginning and/or end of the forming rail to receive the components prior to and subsequent to the bending operation. This has the advantage of enabling the device to be loaded or unloaded readily, the components being moved continuously over the forming rail and bent in the process.

It is also possible for a loading and an unloading station to be provided at the beginning and at the end of the forming rail. It is thus proposed advantageously for the bending device to be loaded and unloaded automatically, enabling the device to operate in an automated environment and hence particularly economically.

A further embodiment of the present invention, which may also be an independent invention, proposes a component made of a thermoplastic material, in particular a sleeve-shaped component for a personal care appliance such as a dental care apparatus or the like, which is manufactured according to any one of the method claims referred to in the foregoing. Such a component includes advantageously an essentially hollow cylindrical body with a lower shank, a middle section to be formed, and a tip of essentially frusto-conical shape, in which the shank has a larger diameter than the middle section to be formed. A component of this type can be manufactured in large quantities particularly advantageously and at low cost, particularly as an injection molded part, and is advantageously suited therefore for a bending operation in accordance with the above mentioned methods.

A further embodiment of the present invention, which may represent an independent invention, proposes manufacturing a component made of a thermoplastic material, in particular a sleeve-shaped component for a personal care appliance such as a dental care apparatus or the like, in a device described above. Such a component is, for example, an essentially hollow cylindrical body with a lower shank, a middle section to be formed, and a tip of essentially frusto-conical shape, in which the shank has a larger diameter than the middle section to be formed. Advantageously, a component of this type may be manufactured in large quantities and at low cost, particularly as an injection molded part, and is advantageously suited for forming, that is, bending in a device mentioned in the foregoing. Providing the shank with a larger diameter than the component's middle section to be formed advantageously defines a stable section on which the holding means can engage simply and securely.

A particularly advantageous embodiment of the component provides for engagement surfaces of frusto-conical shape in the areas of transition between the shank and the middle section and between the middle section and the tip, with the tips of these truncated cones pointing at each other. This configuration of the component's engagement surfaces enables the middle section to be accurately positioned against the engagement surface of the forming rail for forming.

In a further aspect, a component with a stepped, continuous bore is provided. This advantageously enables a rotary dental cleansing device to be guided in this component.

Advantageously, this stepped bore has its smallest diameter in the tip of the component so that the dental cleansing device provided in the component can be guided in the tip with minimum possible play.

The component is made of polycarbonate, polypropylene, styrene acrylonitrile, or a similar plastic material. Hence provision is made advantageously for a particularly tough plastic that displays little tendency to brittle fracture while at the same time being resistant to chemicals. Furthermore, the softening point with these plastics lies below the shrinkage temperature.

In a particularly advantageous aspect, the component to be bent, namely the sleeve, is made of SAN (styrene acrylonitrile). This material displays the best properties with regard to durability, neutrality of taste, color fastness etc. for a component intended for use in a dental cleaning apparatus.

To bend a sleeve in accordance with an above mentioned method and in an above mentioned device, the component is heated to a temperature of 90° C. to 120° C., particularly to between 102° C. and 106° C. This produces advantageously a good bending result with a low scrap percentage of the components to be bent.

Particularly advantageously, a component is manufactured in accordance with an above mentioned method and in an above mentioned device if the component's moisture content does not drop below a minimum level during the bending operation. The component's moisture content should amount to at least 0.02% by weight, particularly 0.08% by weight, in order advantageously for the heat to be transferred in the component with maximum efficiency and at maximum possible speed.

Further features, advantages and application possibilities of the present invention will become apparent from the subsequent description of embodiments illustrated in more detail in the accompanying drawings. It will be understood that any single feature and any combination of single features described and/or represented by illustration form the subject-matter of the present invention, irrespective of their summary in the claims and their back-reference.

DETAIL DESCRIPTION OF THE INVENTION

A device according to the present invention (FIG. 1) comprises a base plate 2 and a movable frame 4 in which a support 6 is embedded. Arranged on the support 6 is a U-shaped rail 8 having a cavity in which there is a channel 10 for carrying a heat transfer medium such as oil or water. This U-shaped rail 8 is covered on the top by a forming rail 12, the two parts 8 and 12 being joined tightly together. Advantageously, the U-shaped rail 8 and the forming rail 12 are made of a material of good thermal conductivity so that the engagement surface 14 at one end of the forming rail 12 is also heated sufficiently. The engagement surface 14 is that surface on the forming rail 12 which is essential to the present invention and which dictates the shape of the component to be bent.

Figure 1:
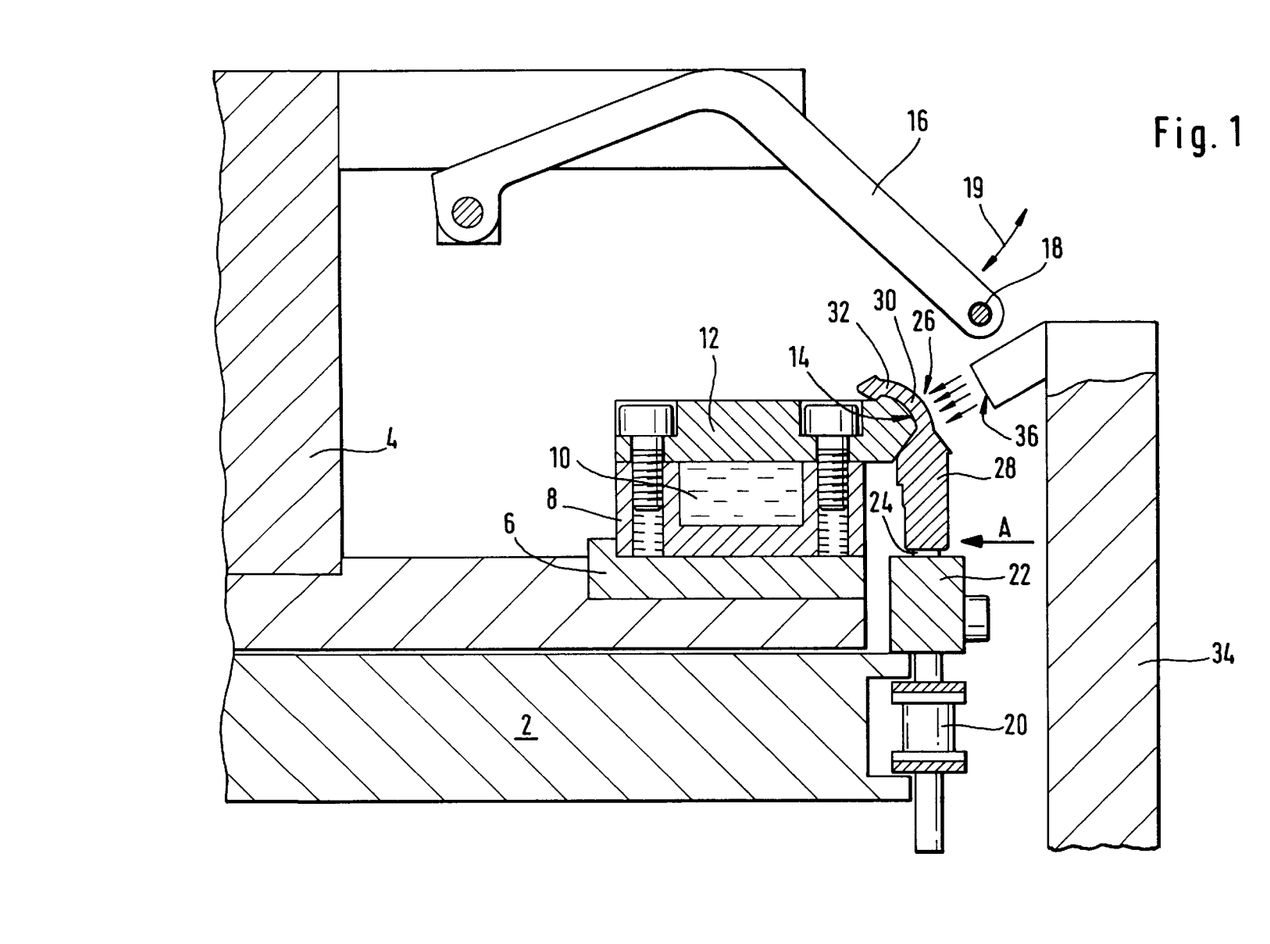
FIG. 1 is a schematic sectional view of a device of the present invention incorporating a heating unit, a holding and feeding means with a bent sleeve, a forming rail and a bending tool.

Furthermore, a bending tool 16 carrying a guide roller 18 at its free end and being adjustable in a straight line or pivotal on the arc of a circle in the direction of movement 19 is pivotally mounted on the frame 4. The guide roller 18 is profiled to conform with its engagement surface to the outer contour of a component 26 to be bent. The guide roller 18 is equipped with a negative crown to guide the sleeve, thus preventing the sleeve from twisting on the engagement surface 14 under the action of friction while the section 30 to be formed on the sleeve 26 is sliding.

In addition, a roller chain 20 extending as a feeding means parallel to the rail 12 is guided on the base plate 2 of the device. The chain 20 is connected to a holding means 22 which carries a mandrel 24 to receive the component 26 to be bent. The component to be bent may be an essentially rotationally symmetric body of sleeve shape comprising a lower shank 28, a middle section 30 to be formed, and a conical head 32. The component 26 to be bent is connected to the holding means 22 and the chain 20 in such a way as to enable this sub-assembly to be moved parallel to the longitudinal dimension of the forming rail, that is, in the direction leading into the image plane or out of the image plane. The bending tool 16 may be moved together with the component 26 parallel to the forming rail 12. The sleeve-shaped component 26, hereinafter also called sleeve, is connected to the holding and feeding device 20, 22 in such a way that it lies with a longitudinal side thereof, in one section at least, against the engagement surface 14 of the forming rail 12, being thus heated by direct contact with the heated forming rail 12.

A heating unit 34 is provided on the longitudinal side of the component 26 facing away from the engagement surface 14. This heating unit is equipped with a heating nozzle 36 which is directed essentially at the middle section 30 to be formed of the component 28 and is operated with hot air, for example.

To enable the component 26 to undergo a uniform bending operation against the forming rail 12, provision is made for the engagement surface 14 on the rail 12 to have a different profile in a section at the beginning and at the end.

The profile of the engagement surface 14 on the forming rail 12 for manufacturing a bent sleeve-shaped component varies continuously. From this continuous bending process (FIG. 2), four sections taken in the longitudinal direction of the rail 12 are illustrated by way of example, showing the component 26 at bending angles of 0°, 30°, 60°, and in its final shape at 90°. It is possible of course to present the entire bending operation in a practically infinite number of momentary shots because the profile of the engagement surface 14 varies continuously from a section at the beginning to a section at the end of the forming rail 12.

Figure 2:
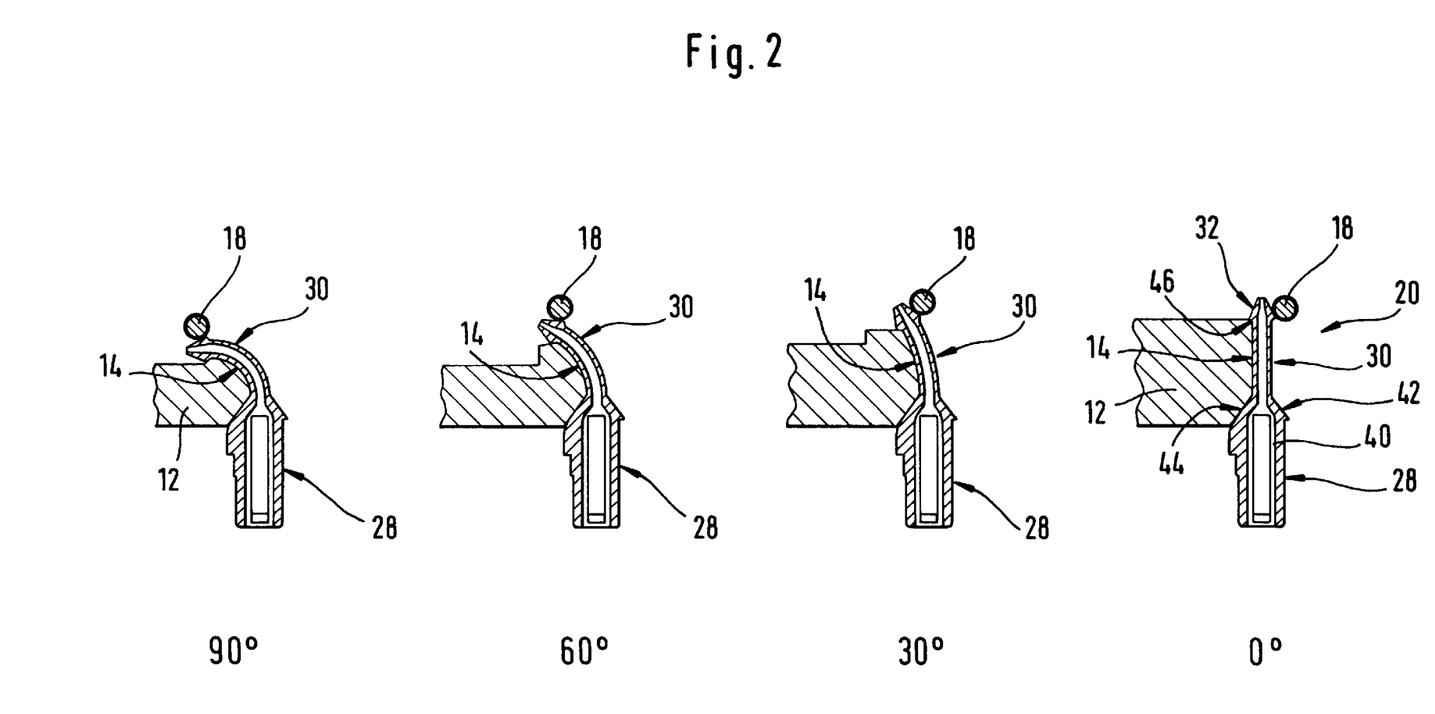
FIG. 2 is a sectional view of a sleeve shown in engagement with a forming rail prior to the beginning of the bending operation, and in 30° steps as the bending operation is proceeding.

The component 26 to be bent is an essentially rotationally symmetric sleeve having a continuous, yet stepped bore 40. The lower shank 28 receiving the lower part of the bore 40 serves to locate the sleeve 26 on a holding and feeding means that is not shown however for greater clarity of the illustration. Adjoining the lower shank 28 in upward direction is a middle neck-type section 30 to be formed, ending at a conical tip 32. Frusto-conical engagement surfaces 42 are provided in the areas of transition between the shank 28 and the middle section 30 and between the middle section 30 and the tip 32, the tips of these truncated cones being arranged to point at each other. These engagement surfaces 42 are used, inter alia, to position the sleeve 26 against the engagement surface 14. For this purpose the rail 12 is equipped with a lower and an upper guide surface 44, 46 matching the geometrical configuration of the engagement surface 42 on the sleeve 26. Optimum positioning of the sleeve 26 against the forming rail 12 is thus possible, and an axial displacement of the sleeve 26 during the bending operation is ruled out.

The guide roller 18, of which the related bending tool 16 is not shown in the interest of greater clarity, is placed against the conical surface of the component head 32 on the side facing away from the engagement surface 14 and is caused to follow the head 32 in accordance with the forming of the sleeve 26.

As the distance of the component 26 from the section at the beginning of the forming rail 12 increases—identified by 30° in the second picture of FIG. 2—so the profile of the engagement surface 14 changes progressively from a straight line to the arc of a quarter circle as identified by 90° in the fourth picture of FIG. 2. What is important is that the sleeve 26, and particularly the section 30 to be formed, is in permanent line contact with the engagement surface 14 of the rail 12. This guarantees the necessary transfer of heat from the heated rail 12 to the component's section 30. Furthermore, the jet of hot air emerging from the heating nozzle 36 (as shown in FIG. 1) is altered in direction to match the degree of deformation of the sleeve 26, so that it only ever heats the section 30 to be formed to shape.

In an embodiment of a method according to the present invention, a cycle time of 16 to 20 seconds, approximately, was achieved for the complete bending of a sleeve-shaped component. This cycle time depends essentially on the heat-up time required for bending the component between the rail and the heating unit.

The guide roller 18 of the bending tool 16 is caused to roll along the conical tip 32 of the sleeve 26 during the bending operation. Low-friction bending with a necessary contact pressure of the roller 18 against the head 32 is thus possible.

Figure 3:
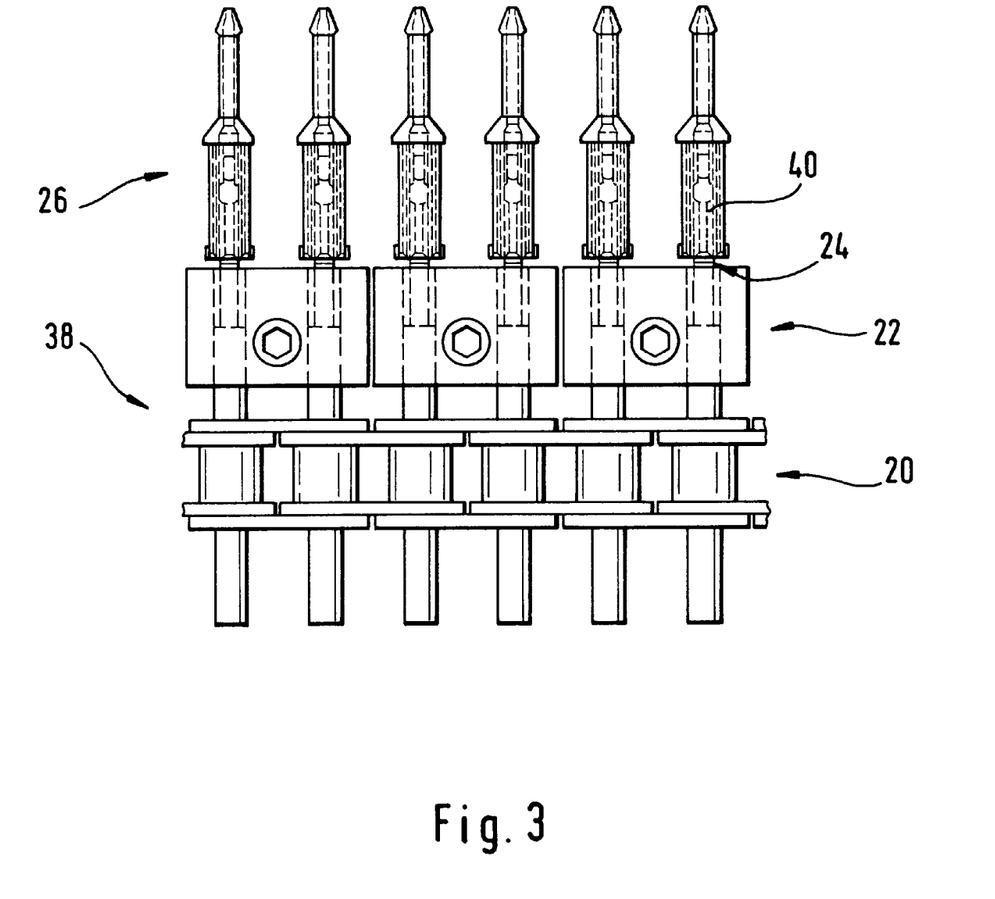
FIG. 3 is a side view of a linear array of sleeves to be bent which are arranged on a holding and feeding means, similar to the view A of FIG. 1.

The sleeves 26 to be bent (FIG. 3) are connected to the holding and feeding means 38 so that they are in close proximity and parallel to each other. This high density of components enables a continuous and extremely economical bending process. Construction of the holding and feeding means 38 in the form of a roller chain 20 having holding means 22 fastened in segmental fashion means that this sub-assembly is extremely flexible and readily adaptable to any imaginable shape of a forming rail, regardless of whether the forming rail is configured as a straight, curved or circular-arc-shaped rail.

Figure 4:
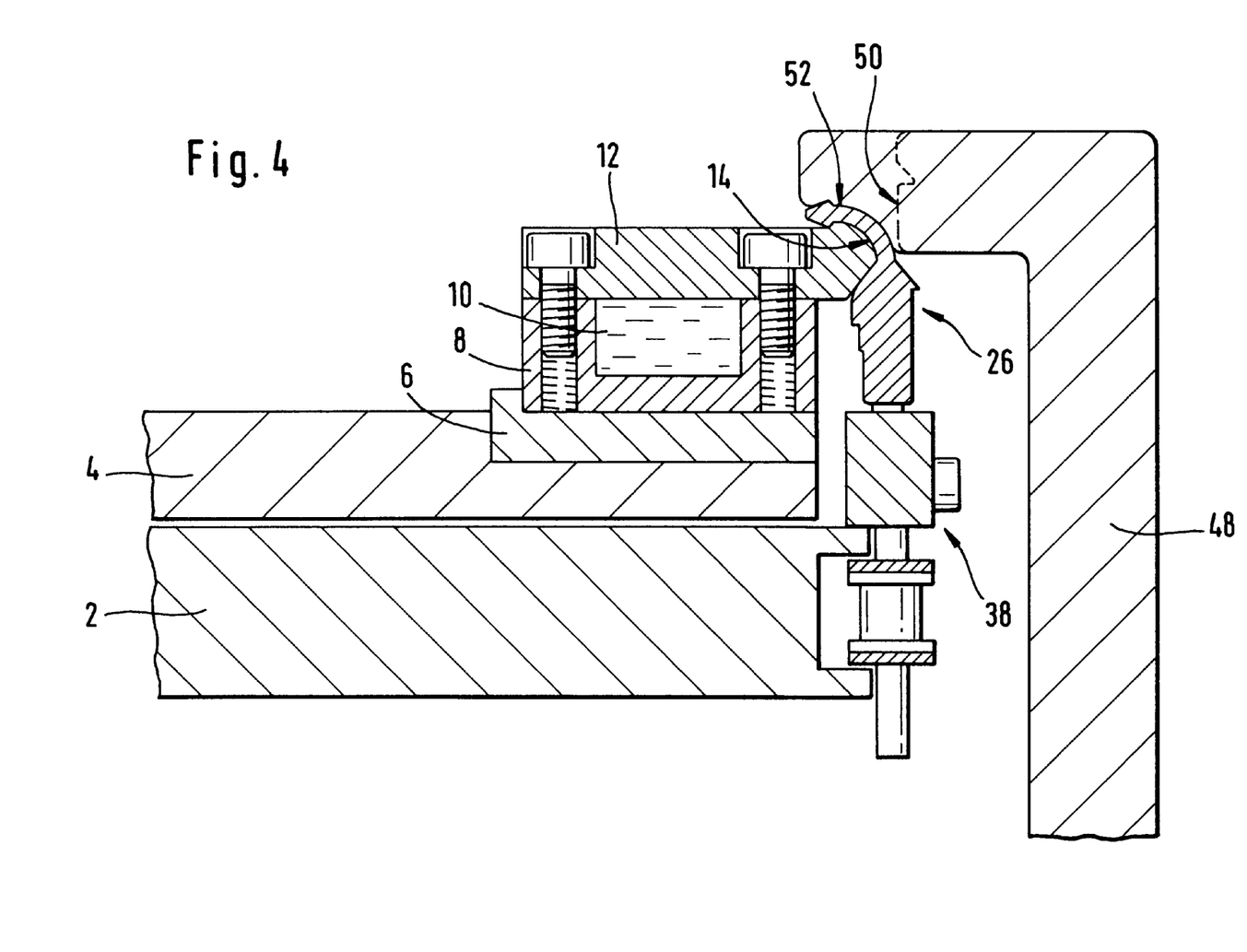
FIG. 4 is a schematic sectional view of a device similar to that of FIG. 1, but with two bending tools that are stationary relative to each other.

An alternative embodiment (FIG. 4) to the device with a movable bending tool 16 shown in FIG. 1 comprises the arrangement of a second stationary bending tool 48, in which arrangement the sleeve 26 is guided in a channel-type space formed between the engagement surface 14, the forming rail 12 and an engagement surface 52 of the second bending tool 48. It will be understood, of course, that the engagement surface of the second bending tool 48 is also varied in dependence upon the profile construction of the engagement surface 14 on the rail 12. Hence the second bending tool has a straight engagement surface 50 in a section at the beginning, eventually turning into a curved engagement surface 52 in the section at the end of the tool 48.

What is claimed is:

1. A method for bending a component made of a thermoplastic material, comprising:
   heating the component up to the softening point of the thermoplastic material;
   bringing the component into engagement with a forming rail having a profile and a length;
   moving one of the component and the forming rail relative to the other one of the component and the forming rail; and
   while moving the one of the component and the forming rail, bending the component into a shape having a bend by maintaining the component against the forming rail by means of a bending tool, wherein the profile of the forming rail defines an engagement surface between the component and the forming rail and the profile varies along the length of the forming rail such that the bend in the shape of the component is continuously defined by the profile of the forming rail.

2. The method as claimed in claim 1, wherein the step of bringing the component into engagement also involves arranging the component to be bent vertically to the forming rail.

3. The method as claimed in claim 1, wherein the step of bringing the component into engagement involves bringing the component into linear engagement with the forming rail.

4. The method as claimed in claim 1, wherein the step of moving involves moving the component essentially parallel to the forming rail.

5. The method as claimed in claim 1, wherein the step of moving involves moving the component at a constant speed relative to the forming rail.

6. The method as claimed in claim 1, further comprising altering the position of the bending tool relative to the guide rail during the moving step.

7. The method as claimed in claim 1, wherein the step of heating involves moving the component past a stationary heating unit.

8. The method as claimed in claim 1, wherein the moving step involves moving a heating unit as well as the component relative to the rail.

9. The method as claimed in claim 1, wherein the step of heating involves heating the component only in an area of the bend.

10. The method as claimed in claim 1, wherein the step of moving involves moving several components in a linear arrangement relative to the forming rail.

11. The method as claimed in claim 1, wherein said forming rail has a different profile in a section at the beginning and at the end thereof.

12. The method as claimed in claim 11, wherein the profile of the forming rail varies continuously along its length.

13. The method as claimed in claim 1, further comprising moving the bending tool as well as the component relative to the rail.

14. The method as claimed in claim 1, further comprising moving the bending tool in a plane arranged vertically to the longitudinal axis of the rail.

15. The method as claimed in claim 14, wherein the step of moving the bending tool involves causing the bending tool to perform a movement on the arc of a circle.

16. The method as claimed in claim 14, wherein the step of moving the bending tool involves causing the bending tool to perform a straight movement.

17. The method as claimed in any one of claims 13, 14, 16, and 15, wherein the step of moving the bending tool involves causing the bending tool to perform a continuous movement.

* * * * *